(12) United States Patent
Xu et al.

(10) Patent No.: US 12,634,797 B2
(45) Date of Patent: May 19, 2026

(54) HYBRID MEASUREMENT FOR SIDELINK RELAY SELECTION

(71) Applicant: QUALCOMM Incorporated, San Diego, CA (US)

(72) Inventors: Huilin Xu, Temecula, CA (US); Peng Cheng, Beijing (CN); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/250,675

(22) PCT Filed: Jan. 13, 2021

(86) PCT No.: PCT/CN2021/071371

§ 371 (c)(1),
(2) Date: Apr. 26, 2023

(87) PCT Pub. No.: WO2022/151000

PCT Pub. Date: Jul. 21, 2022

(65) Prior Publication Data

US 2024/0007927 A1     Jan. 4, 2024

(51) Int. Cl.
| | |
|---|---|
| *H04W 40/22* | (2009.01) |
| *H04W 40/12* | (2009.01) |
| *H04W 88/04* | (2009.01) |

(52) U.S. Cl.
CPC .......... *H04W 40/22* (2013.01); *H04W 40/12* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 10,454,551 | B2 * | 10/2019 | Baek | .................... H04B 7/0602 |
| 2013/0130687 | A1 * | 5/2013 | Kumar Reddy | .... H04W 36/304 |
| | | | | 455/67.11 |

(Continued)

OTHER PUBLICATIONS

3rd Generation Partnership Project; Technical Specification Group Radio Access Network; NR; NR and NG-RAN Overall Description; Stage 2 (Release 16), 3GPP Draft, Draft 38300-G40, 3rd Generation Partnership Project (3GPP), Mobile Competence Centre, 650, Route Des Lucioles, F-06921, Sophia-Antipolis Cedex, France, Dec. 22, 2020 (Dec. 22, 2020), XP051967035, 38.300, V16.4.0, pp. 1-149, p. 133, line 7-p. 134, line 3.

(Continued)

*Primary Examiner* — Brian S Roberts
(74) *Attorney, Agent, or Firm* — QUALCOMM Incorporated

(57) ABSTRACT

Various aspects of the present disclosure generally relate to wireless communication. In some aspects, a user equipment (UE) may obtain, for each of one or more sidelink relay candidates, a measurement of a sidelink signal and a measurement of a Uu signal to a base station. The UE may select a sidelink relay candidate from among the one or more sidelink relay candidates based at least in part on a combination of the measurement of the sidelink signal and the measurement of the Uu signal for each sidelink relay candidate. The UE may transmit, to the selected sidelink relay candidate, a message that is to be relayed to the base station. Numerous other aspects are described.

30 Claims, 10 Drawing Sheets

500

Uu signal 542

Uu signal 546

UE 530

BS 510

Sidelink signal 548

Sidelink signal 544

UE 520

560
Transmit message to be relayed

UE 540

550
Obtain sidelink signal measurement and Uu signal measurement for each sidelink relay candidate 555
Select sidelink relay candidate based at least in part on measurements

(56)　　　　　　　References Cited

U.S. PATENT DOCUMENTS

| | | | | |
|---|---|---|---|---|
| 2014/0243040 | A1* | 8/2014 | Bienas | H04W 88/06 |
| | | | | 455/552.1 |
| 2016/0337954 | A1* | 11/2016 | Gulati | H04W 48/17 |
| 2018/0352411 | A1 | 12/2018 | Ryu et al. | |
| 2020/0068580 | A1* | 2/2020 | Tang | H04W 76/14 |
| 2020/0163005 | A1* | 5/2020 | Rao | H04W 4/44 |
| 2020/0329481 | A1 | 10/2020 | Yi et al. | |
| 2020/0351690 | A1* | 11/2020 | Zhu | H04B 17/318 |
| 2021/0105066 | A1* | 4/2021 | Uchiyama | H04W 88/04 |
| 2022/0060967 | A1* | 2/2022 | Xu | H04W 40/22 |
| 2023/0269611 | A1* | 8/2023 | Ren | H04W 24/10 |
| | | | | 370/252 |

OTHER PUBLICATIONS

Huawei, et al., "RRC Corrections on NR SON and MDT," 3GPP Draft, 3GPP TSG-RAN WG2 Meeting #112-e, RP-202776, R2-2011264, 3rd Generation Partnership Project (3GPP), Mobile Competence Centre, 650, Route Des Lucioles, F-06921, Sophia-Antipolis Cedex, France, vol. RAN WG2, No. Electronic, Nov. 2, 2020-Nov. 13, 2020, Dec. 3, 2020 (Dec. 3, 2020), XP051964874, 923 pages, Section 5.5.1.

International Search Report and Written Opinion—PCT/CN2021/071371—ISA/EPO—Jul. 2, 2021.

\* cited by examiner

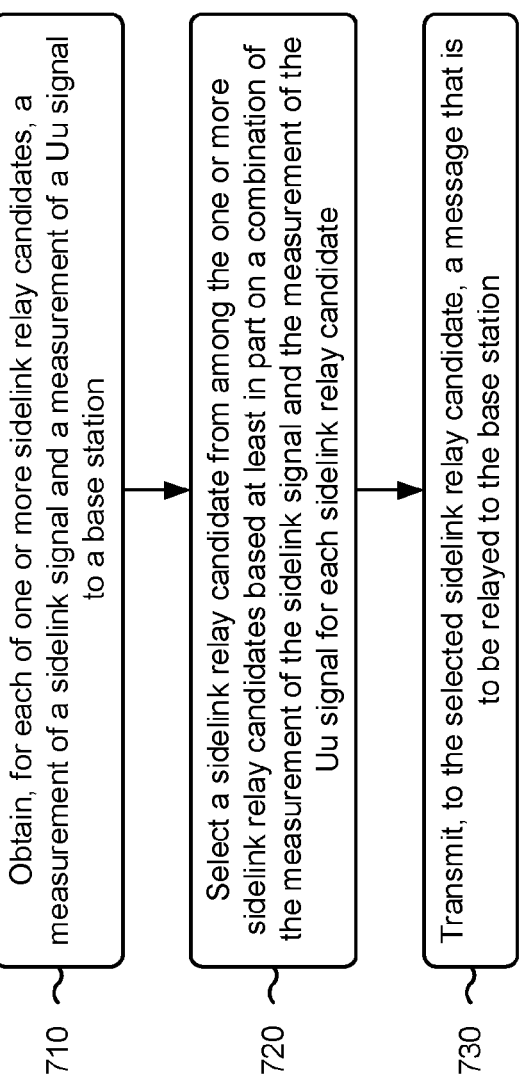

710 Obtain, for each of one or more sidelink relay candidates, a measurement of a sidelink signal and a measurement of a Uu signal to a base station 720 Select a sidelink relay candidate from among the one or more sidelink relay candidates based at least in part on a combination of the measurement of the sidelink signal and the measurement of the Uu signal for each sidelink relay candidate 730 Transmit, to the selected sidelink relay candidate, a message that is to be relayed to the base station

810 Generate a CLI configuration that includes uplink transmission occasions or resources for measurements of signals from a first UE 820 Transmit the CLI configuration to a second UE

800

HYBRID MEASUREMENT FOR SIDELINK RELAY SELECTION

CROSS-REFERENCE TO RELATED APPLICATION

This Patent Application is a 371 national stage of PCT Application No. PCT/CN2021/071371 filed on Jan. 13, 2021, entitled "HYBRID MEASUREMENT FOR SIDE-LINK RELAY SELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid measurement for sidelink relay selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes obtaining, for each of one or more sidelink relay candidates, a measurement of a sidelink signal and a measurement of a Universal Mobile Telecommunications System Terrestrial Radio Access Network and UE (Uu) signal to a base station. The method includes selecting a sidelink relay candidate from among the one or more sidelink relay candidates based at least in part on a combination of the measurement of the sidelink signal and the measurement of the Uu signal for each sidelink relay candidate and transmitting, to the selected sidelink relay candidate, a message that is to be relayed to the base station.

In some aspects, a method of wireless communication performed by a base station includes generating a cross-link interference (CLI) configuration that includes uplink transmission occasions or resources for measurements of signals from a first UE and transmitting the CLI configuration to a second UE.

In some aspects, a UE for wireless communication includes a memory and one or more processors operatively coupled to the memory, the memory and the one or more processors configured to obtain, for each of one or more sidelink relay candidates, a measurement of a sidelink signal and a measurement of a Uu signal to a base station. The one or more processors are configured to select a sidelink relay candidate from among the one or more sidelink relay candidates based at least in part on a combination of the measurement of the sidelink signal and the measurement of the Uu signal for each sidelink relay candidate and transmit, to the selected sidelink relay candidate, a message that is to be relayed to the base station.

In some aspects, a base station for wireless communication includes a memory and one or more processors operatively coupled to the memory, the memory and the one or more processors configured to generate a CLI configuration that includes uplink transmission occasions or resources for measurements of signals from a first UE and transmit the CLI configuration to a second UE.

In some aspects, a non-transitory computer-readable medium storing a set of instructions for wireless communication includes one or more instructions that, when executed by one or more processors of a UE, cause the UE to obtain, for each of one or more sidelink relay candidates, a measurement of a sidelink signal and a measurement of a Uu signal to a base station, select a sidelink relay candidate from among the one or more sidelink relay candidates based at least in part on a combination of the measurement of the sidelink signal and the measurement of the Uu signal for each sidelink relay candidate, and transmit, to the selected sidelink relay candidate, a message that is to be relayed to the base station.

In some aspects, a non-transitory computer-readable medium storing a set of instructions for wireless communication includes one or more instructions that, when executed by one or more processors of a base station, cause the base station to generate a CLI configuration that includes uplink transmission occasions or resources for measurements of signals from a first UE and transmit the CLI configuration to a second UE.

In some aspects, an apparatus for wireless communication includes means for obtaining, for each of one or more sidelink relay candidates, a measurement of a sidelink signal and a measurement of a Uu signal to a base station, means for selecting a sidelink relay candidate from among the one or more sidelink relay candidates based at least in part on a combination of the measurement of the sidelink signal and the measurement of the Uu signal for each sidelink relay candidate, and means for transmitting, to the selected sidelink relay candidate, a message that is to be relayed to the base station.

In some aspects, an apparatus for wireless communication includes means for generating a CLI configuration that includes uplink transmission occasions or resources for measurements of signals from a first UE and means for transmitting the CLI configuration to a second UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
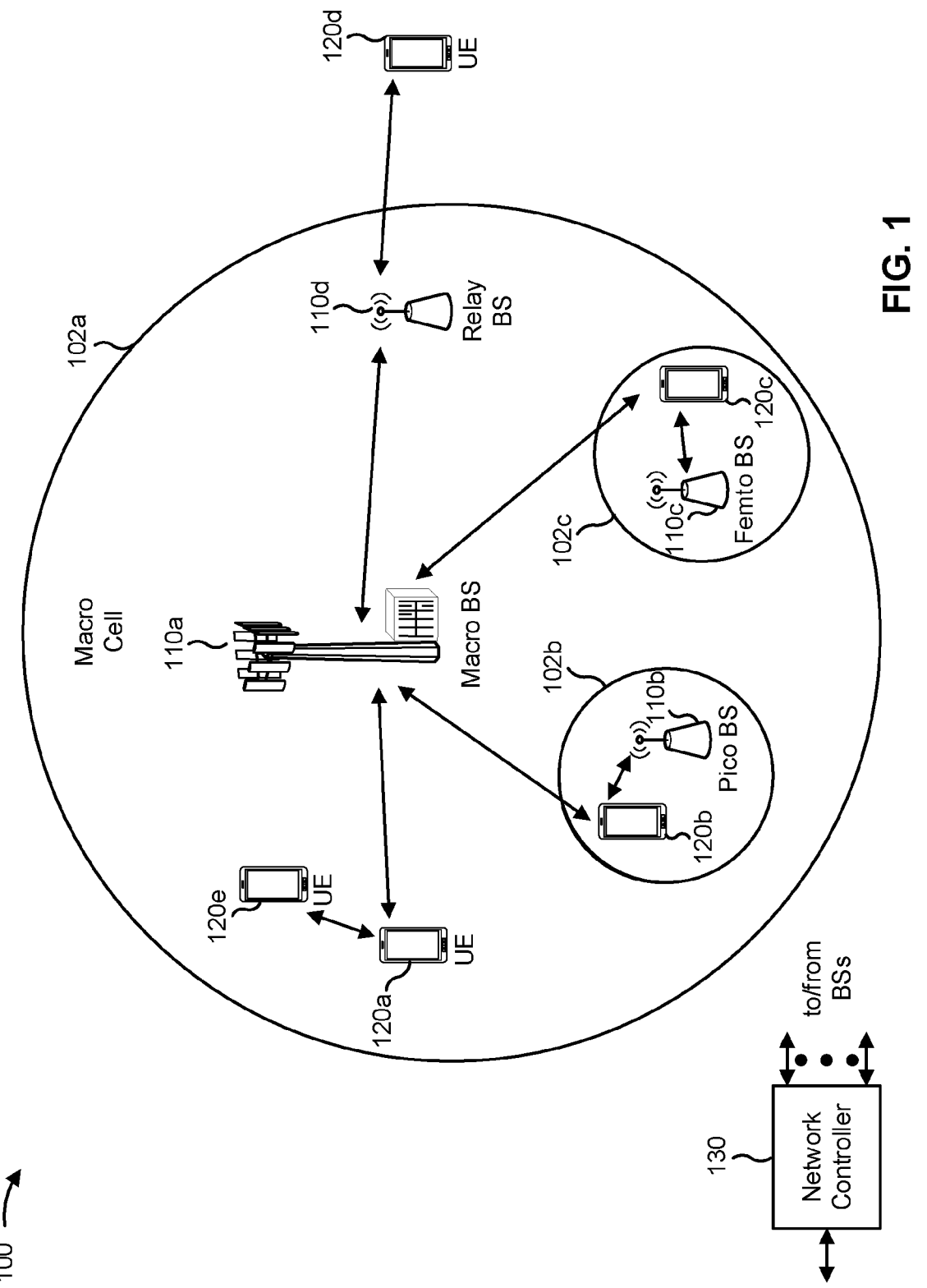
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
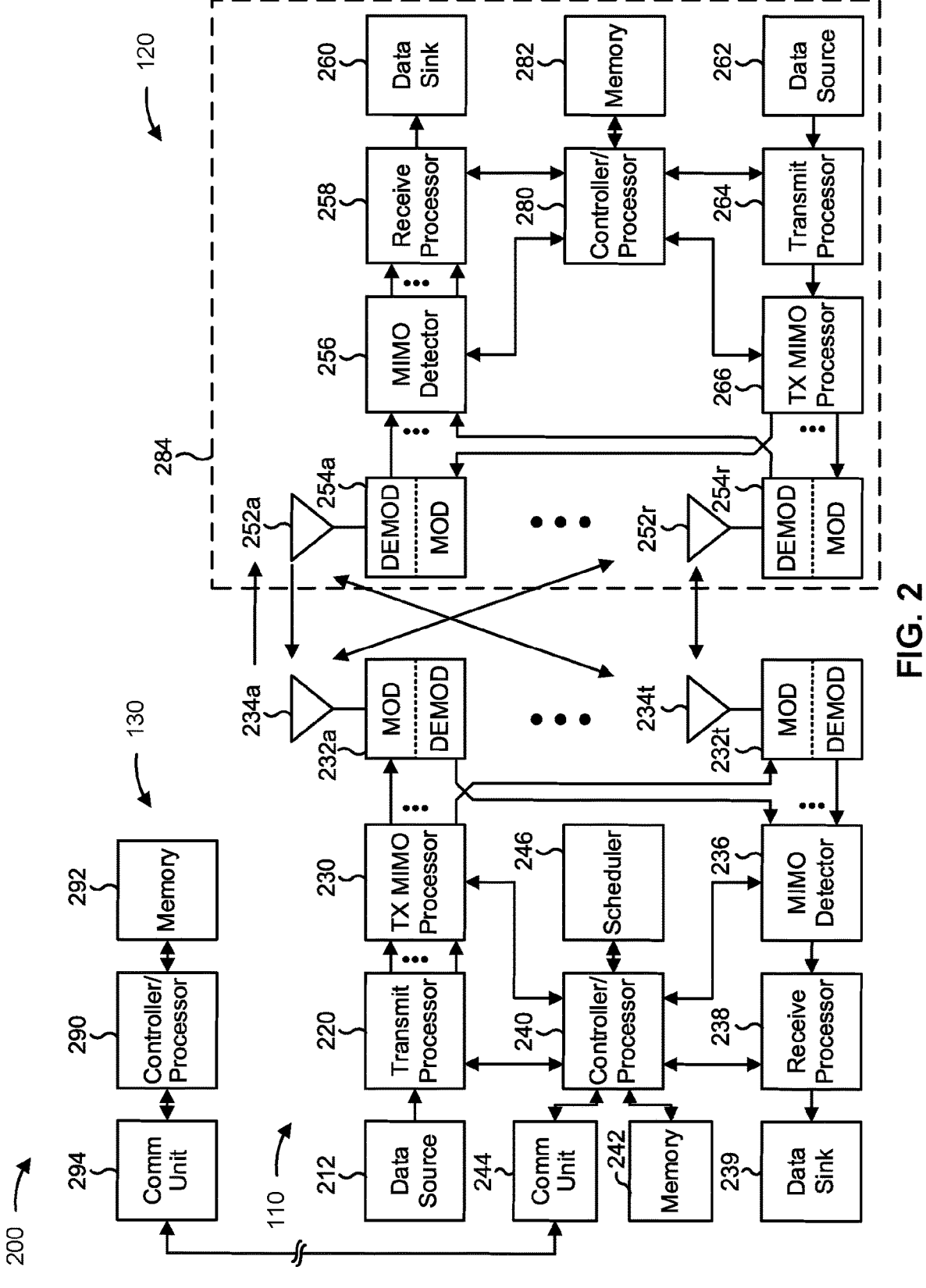
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-10.

Controller/processor 240 of base station 110, controller/processor 280 of UE 120, and/or any other component(s) of FIG. 2 may perform one or more techniques associated with hybrid measurement for sidelink relay selection, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for obtaining, for each of one or more sidelink relay candidates, a measurement of a sidelink signal and a measurement of a Universal Mobile Telecommunications System Terrestrial Radio Access Network (UTRAN) and UE (Uu) signal to a base station, means for selecting a sidelink relay candidate from among the one or more sidelink relay candidates based at least in part on a combination of the measurement of the sidelink signal and the measurement of the Uu signal for each sidelink relay candidate, and/or means for transmitting, to the selected sidelink relay candidate, a message that is to be relayed to the base station. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for receiving an identity of each respective sidelink relay candidate in an inter-UE measurement resource configuration for measuring the Uu signal, and/or means for associating an inter-UE measurement resource with the respective sidelink relay candidate based at least in part on the identity, where the measurement of the Uu signal includes a measurement of the inter-UE resource.

In some aspects, UE 120 includes means for determining the combination of the measurement of the sidelink signal and the measurement of the Uu signal based at least in part on jointly processing the measurement of the sidelink signal and the measurement of the Uu signal in a same filter.

In some aspects, UE 120 includes means for determining the combination of the measurement of the sidelink signal and the measurement of the Uu signal based at least in part on processing the measurement of the sidelink signal and the measurement of the Uu signal with separate filters and using a maximum of the measurement of the sidelink signal and the measurement of the Uu signal for sidelink relay candidate selection.

In some aspects, UE 120 includes means for determining the combination of the measurement of the sidelink signal and the measurement of the Uu signal based at least in part on processing the measurement of the sidelink signal and the measurement of the Uu signal with separate filters and using a minimum of the measurement of the sidelink signal and the measurement of the Uu signal for sidelink relay candidate selection.

In some aspects, UE 120 includes means for determining the combination of the measurement of the sidelink signal and the measurement of the Uu signal based at least in part on separately processing the measurement of the sidelink signal and the measurement of the Uu signal with separate filters and selecting the sidelink relay candidate based at least in part on a weighted average of the measurement of the sidelink signal and the measurement of the Uu signal.

In some aspects, UE 120 includes means for applying an offset to the measurement of the Uu signal based at least in part on the Uu signal being in a different frequency band than the sidelink signal.

In some aspects, base station 110 includes means for generating a cross-link interference (CLI) configuration that includes uplink transmission occasions or resources for measurements of signals from a first UE, and/or means for transmitting the CLI configuration to a second UE. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for transmitting identities of sidelink relay candidates to the second UE.

As indicated above, FIG. 2 is provided as an example. Other examples may differ from what is described with regard to FIG. 2.

Figure 3:
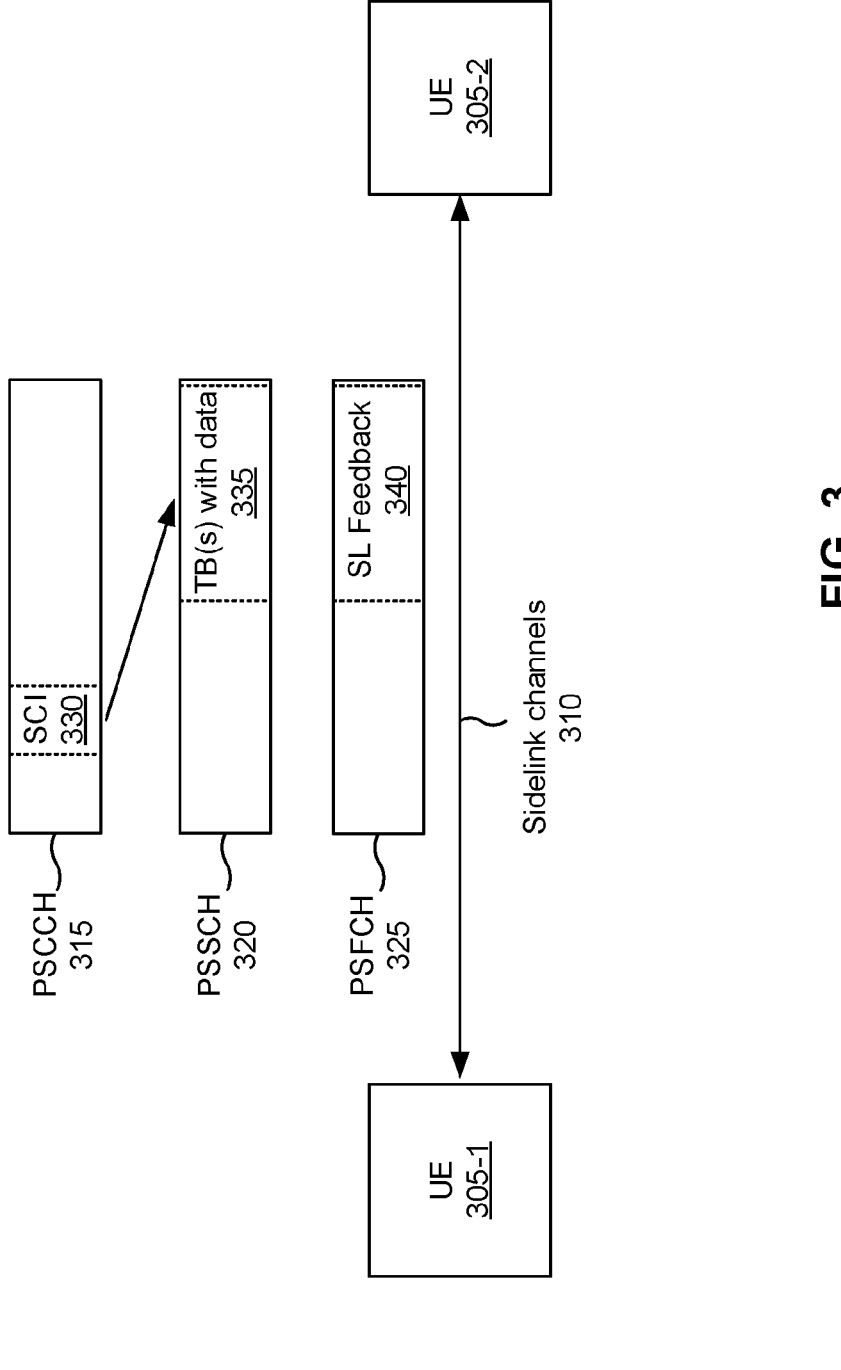
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. UEs 305-1 and 305-2 may communicate using the one or more sidelink channels 310 for P2P communications, D2D communications, V2X communications (e.g., which may include V2V communications, V2I communications, vehicle-to-pedestrian (V2P) communications), and/or mesh networking. In some aspects, UEs 305 (e.g., UE 305-1 and/or UE 305-2) may correspond to one or more other UEs described elsewhere herein, such as UE 120. In some aspects, one or more sidelink channels 310 may use a PC5 interface and/or may operate in a high frequency band (e.g., the 5.9 GHz band). Additionally, or alternatively, UEs 305 may synchronize timing of transmission time intervals (TTIs) (e.g., frames, subframes, slots, symbols, and/or the like) using global navigation satellite system (GNSS) timing.

As further shown in FIG. 3, one or more sidelink channels 310 may include a physical sidelink control channel (PSCCH) 315, a physical sidelink shared channel (PSSCH) 320, and/or a physical sidelink feedback channel (PSFCH) 325. PSCCH 315 may be used to communicate control information, similar to a physical downlink control channel (PDCCH) and/or a physical uplink control channel (PUCCH) used for cellular communications with a base station 110 via an access link or an access channel PSSCH 320 may be used to communicate data, similar to a physical downlink shared channel (PDSCH) and/or a physical uplink shared channel (PUSCH) used for cellular communications with a base station 110 via an access link or an access channel. For example, PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on PSSCH 320. TB 335 may include data. PSFCH 325 may be used to communicate sidelink feedback 340, such as HARQ feedback (e.g., acknowledgement or negative acknowledgement (ACK/NACK) information), transmit power control (TPC), and/or a scheduling request (SR).

In some aspects, one or more sidelink channels 310 may use resource pools. For example, a scheduling assignment (e.g., included in SCI 330) may be transmitted in subchannels using specific resource blocks (RBs) across time. In some aspects, data transmissions (e.g., on PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode, known as sidelink mode 2, where resource selection and/or scheduling is performed by UE 305 (e.g., rather than base station 110 in sidelink mode 1). In some aspects, UE 305 may perform resource selection and/or scheduling by sensing channel availability for transmissions. For example, UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, UE 305 may perform resource selection and/or scheduling using SCI 330 received in PSCCH 315, which may indicate occupied resources, channel parameters, and/or the like. Additionally, or alternatively, UE 305 may perform resource selection and/or scheduling by determining a channel busy rate (CBR) associated with various sidelink channels, which may be used for rate control (e.g., by indicating a maximum number of resource blocks that UE 305 can use for a particular set of subframes).

In the transmission mode (sidelink mode 2) where resource selection and/or scheduling is performed by a UE 305, UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on PSSCH 320 (e.g., for TBs 335), one or more subframes to be used for the upcoming sidelink transmission, a modulation and coding scheme (MCS) to be used for the upcoming sidelink transmission, and/or the like. In some aspects, UE 305 may generate a sidelink grant that indicates one or more parameters for semi-persistent scheduling (SPS), such as a periodicity of a sidelink transmission. Additionally, or alternatively, UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
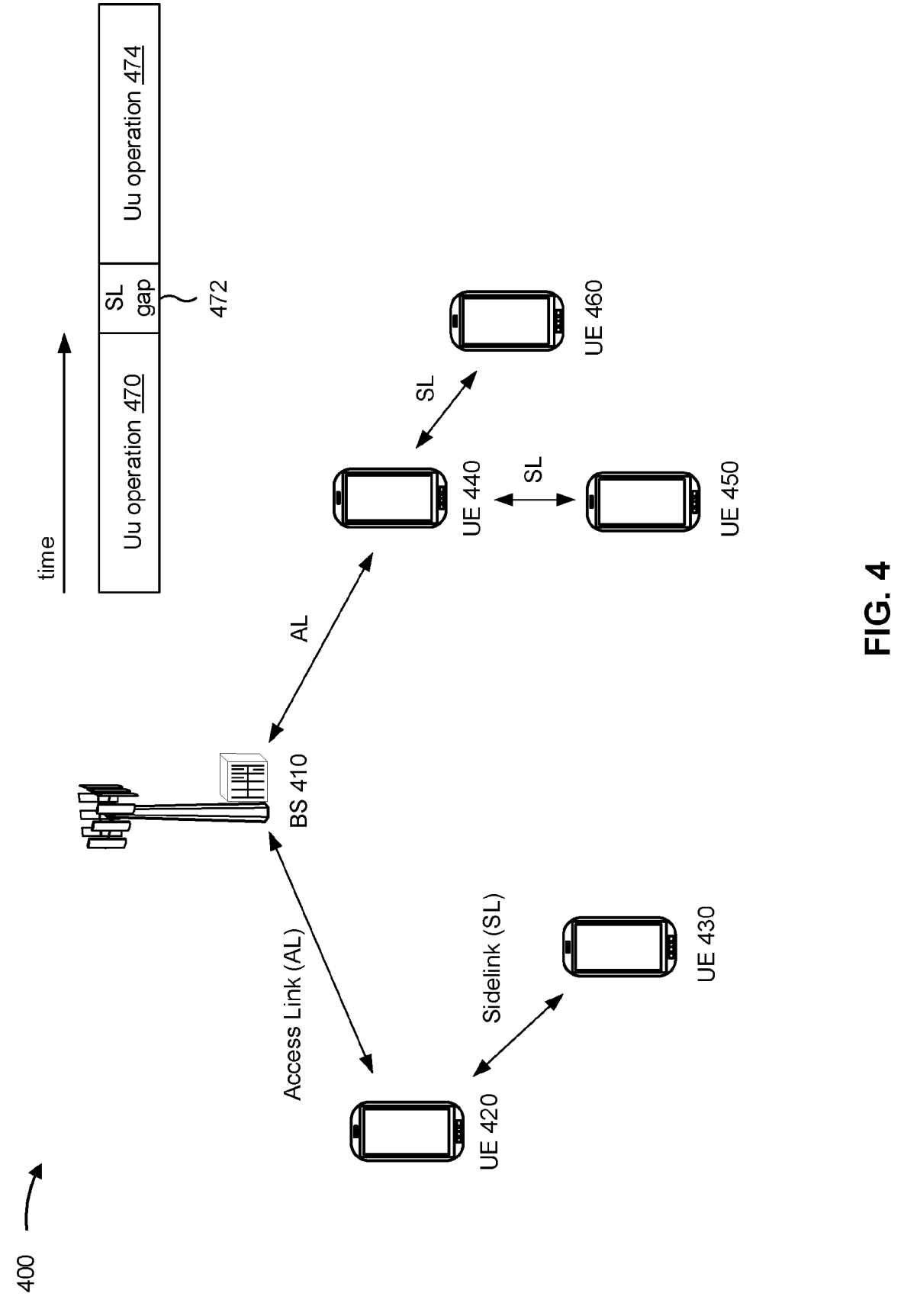
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

Example 400 shows a base station 410 (e.g., base station 110) and a UE 420 (e.g., UE 120) that may communicate with one another via an access link (e.g., via a Uu interface). A communication on the access link may be either a downlink communication (from base station 410 to UE 420) or an uplink communication (from UE 420 to base station 410). Example 400 also shows that UE 420 and UE 430 (e.g., UE 120) may communicate with one another via a sidelink, as described above in connection with FIG. 3. UE 420 relays communications between base station 410 and UE 410 and may be referred to as a "relay UE". UE 430 does not communicate on an access link with base station 110 and may be referred to as a "remote UE".

Sidelink relay may be a mechanism to extend coverage of a network. For example, in an out-of-coverage scenario, UE 420 may be a relay UE that helps extend coverage to UE 430, which is a remote UE that is out of range for the network. UE 420 may relay communications to and from base station 410 using a sidelink between UE 420 and UE 430. In an in-coverage scenario, UE 440 (e.g., UE 120) may be a relay UE, such as an enhanced mobile broadband (eMBB) UE, that helps UE 450 and UE 460 save power by reducing a maximum uplink transmit power. UE 440 may relay communications to and from base station 410 using sidelinks. This may be useful if UE 450 and UE 460 are reduced capacity (RedCap) devices that have less hardware, less battery capacity, or less complexity and that have fewer features than UE 440.

To enable sidelink relay, a remote UE may identify a proper relay UE. For example, UE 430 may have selected UE 420 to be a relay UE from among multiple UEs (sidelink relay candidates). A UE may identify sidelink relay candidates and select the relay UE based at least in part on physical layer measurements. For example, the UE may suspend Uu operation and measure physical layer signals from other UEs on a sidelink channel during a time gap for sidelink measurements. Example 400 shows a period of Uu operation 470, a sidelink measurement gap 472 for sidelink measurements, and another period of Uu operation 474. If a strong signal energy is detected from other UEs during sidelink gap 472, the UE may proceed with relay UE discovery and selection.

If a UE is able to serve as a relay to remote UEs and has enough bandwidth to relay data for the remote UEs, an issue is whether the relay UE is reachable by the remote UEs. Whether a UE is reachable may be determined by a channel path loss between UEs, and the channel path loss may be a function of a distance between UEs.

A remote UE may detect strong signals from multiple UEs that are sidelink relay candidates. The remote UE may sort and/or prioritize the sidelink relay candidates based at least in part on sidelink measurement strengths. However, the remote UE may obtain sidelink measurements only in the sidelink measurement gaps, and the remote UE may not have accurate signal information for the sidelink relay candidates. Without accurate signal strength measurements, the remote UE may not select an optimal sidelink relay candidate to be a relay UE. Selection of a sub-optimal relay UE may increase the chance of degraded communications that cause the remote UE, the relay UE, and the base station to waste power, processing resources, and/or signaling resources.

NR allows for a UE to obtain measurements of Uu uplink signals for another UE. These measurements may be referred to as inter-UE measurements. According to some aspects described herein, a remote UE may obtain, for each sidelink relay candidate, a hybrid of measurements for both sidelink signals and Uu signals, if Uu inter-UE measurement is enabled. Combining sidelink and Uu signal measurements for relay UE selection may improve a quality of measurements of sidelink relay candidates while reducing reliance on measurements taken during the limited sidelink measurement gap. As a result, communications may improve and the remote UE, the relay UE, and the base station conserve power, processing resources, and signaling resources that would otherwise be consumed by transmitting failed communications.

The remote UE may be configured to use a sidelink measurement gap because sidelink communications and Uu communications may have different timing or frequency offsets. Transmission of sidelink communications may follow a Uu downlink timing, and transmission of Uu uplink communications may have a timing offset that is based on a Uu uplink timing advance. In addition, in some scenarios (e.g., railway train or highway), the transmission of Uu uplink communications may involve frequency pre-compensation so that uplink transmissions from different UEs are frequency synchronized at a base station. Because of the timing offset and frequency pre-compensation, Uu communications and sidelink communications may need to be scheduled in different symbols, with unused symbols before or after the symbols to avoid interference between the Uu communications and the sidelink communications.

If the Uu communications and the sidelink communications are in the same frequency band, a sidelink measurement gap can be configured by Uu scheduling through time domain resource allocation. If the Uu communications and the sidelink communications are in different frequency bands, a UE may use a sidelink measurement gap to tune away from a Uu band to measure sidelink signals and then tune back to the Uu band. In this case, the UE may use an inter-frequency measurement gap without Uu communications.

In both the case of the same frequency band and the case of different frequency bands, there may be some overhead for a UE to switch between Uu operation and sidelink measurements due to timing, frequency, and tuning issues. Overhead may be reduced by combining sidelink signal measurements and Uu signal measurements, and by reducing a frequency of sidelink measurements. Reducing overhead further conserves power, processing resources, and signaling resources.

As indicated above, FIG. 4 is provided as an example. Other examples may differ from what is described with respect to FIG. 4.

Figure 5:
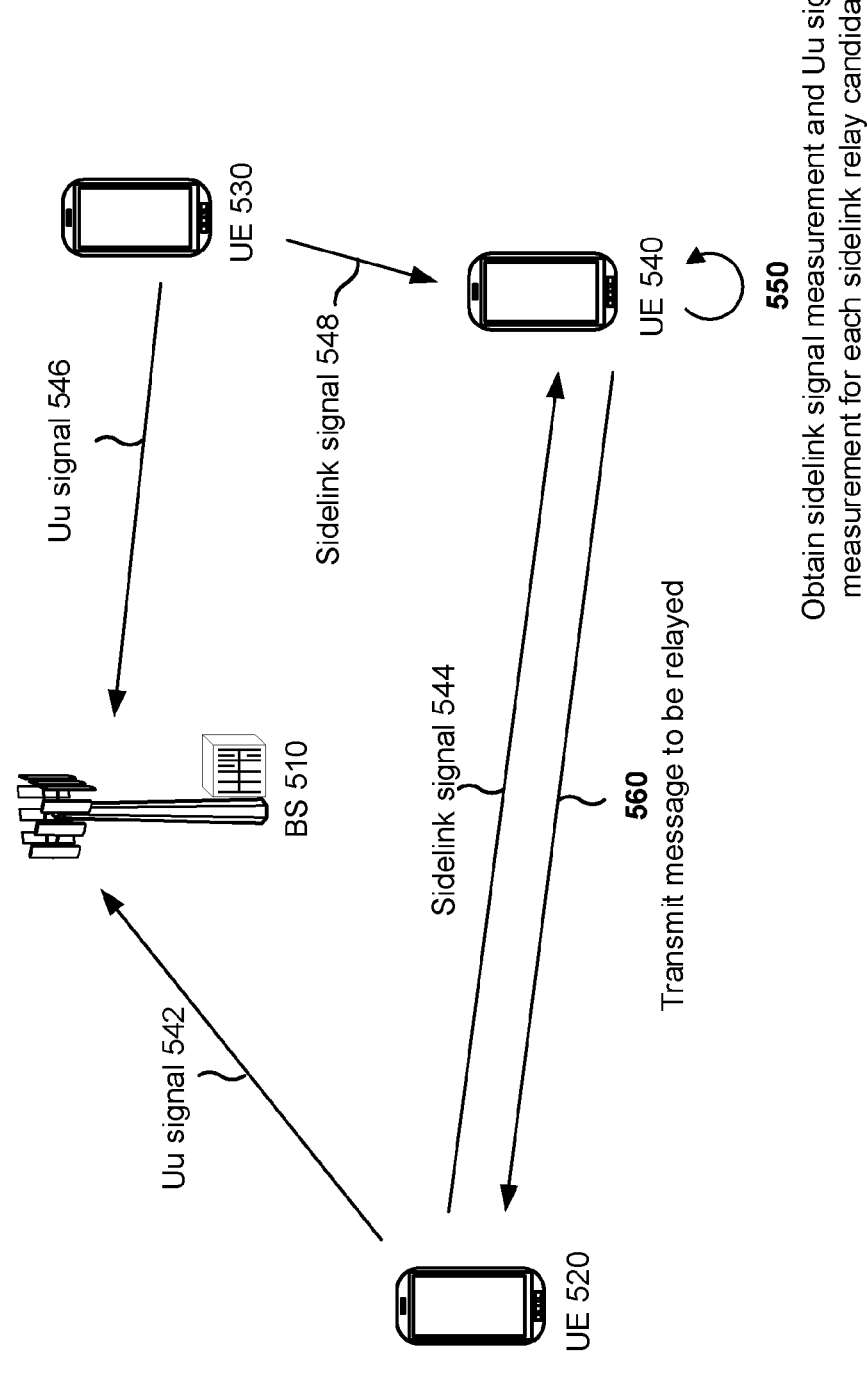
FIG. 5 is a diagram illustrating an example of hybrid measurement for sidelink relay selection, in accordance with various aspects of the present disclosure.

FIG. 5 is a diagram illustrating an example 500 of hybrid measurement for sidelink relay selection, in accordance with various aspects of the present disclosure. As shown in FIG. 5, example 500 includes communications between BS 510 (e.g., a BS 110 depicted in FIGS. 1 and 2) and a UE 520 (e.g., a UE 120 depicted in FIGS. 1 and 2) and communications between BS 510 (e.g., a BS 110 depicted in FIGS. 1 and 2) and a UE 530 (e.g., a UE 120 depicted in FIGS. 1 and 2). In some aspects, BS 510, UE 520, and UE 530 may be included in a wireless network, such as wireless network 100. BS 510, UE 520, and UE 530 may communicate on wireless access links, which may include an uplink and a downlink on a Uu interface. FIG. 5 also shows that UE 520 or UE 530 may communicate on a sidelink with UE 540. BS 510 may specify a sidelink channel resource for transmitting a sidelink communication.

UE 520 may be a sidelink relay candidate that transmits a Uu signal 542 to BS 510 and a sidelink signal 544 that is detected by UE 540. UE 530 may also be a sidelink relay candidate that transmits a Uu signal 546 to BS 510 and a sidelink signal 548 that is detected by UE 540.

As shown by reference number 550, UE 540 may obtain a measurement of Uu signal 542 and a measurement of sidelink signal 544 from UE 520. UE 540 may also obtain a measurement of Uu signal 546 and a measurement of sidelink signal 548 from UE 530. UE 540 may also obtain a measurement of a Uu signal and a measurement of a sidelink signal from other UEs that are sidelink relay candidates. In some aspects, UE 540 may obtain the measurement of sidelink signal 544 and the measurement of sidelink signal 548 during a sidelink measurement gap and obtain the measurement of Uu signal 542 and the measurement of Uu signal 544 outside of the sidelink measurement gap. If UE 540 uses measurements of the Uu signals, the sidelink measurement gap may be less frequent or an interval between sidelink measurement gaps may be larger. This may reduce overhead for switching in and out of the sidelink measurement gap. A reference value for a switching time may be based at least in part on a configuration of a frequency layer per measurement gap, where half a millisecond may be used to switch in or out of the frequency layer.

There may not always be a sidelink signal in a sidelink measurement gap to measure. In some aspects, UE 540 may use a filter to determine a time domain average of sidelink signals from relay UEs. When Uu inter-UE measurements are used as supplementary measurements or as part of a hybrid measurement value, measurements may be more diversified and may more accurately reflect an instantaneous channel condition between UE 540 and relay UEs.

As shown by reference number 555, UE 540 may select a sidelink relay candidate based at least in part on joint consideration of the measurements for each sidelink relay candidate. For example, UE 540 may select UE 520 to be a relay UE based at least in part on a combination of the measurement of Uu signal 542 and the measurement of sidelink signal 544 having a greater RSRP than a combination of the measurement of Uu signal 542 and the measurement of sidelink signal 544 from UE 530.

UE 540 may combine and evaluate a measurement of a Uu signal and a measurement of sidelink signal in various ways. In some aspects, UE 540 may process a measurement of a Uu signal and a measurement of a sidelink signal for a sidelink relay candidate in the same filter. This basically treats the measurement of the Uu signal and the measurement of the sidelink signal with a similar priority. UE 540 may rely more on whichever of the measurement of the Uu signal and the measurement of the sidelink signal is more recent. Note that before joint filtering, the two measurement results may be properly normalized to remove bandwidth and transmit power dependencies.

Alternatively, or additionally, UE 540 may process the measurement of the Uu signal and the measurement of the sidelink signal with separate filters. In this way, UE 540 may rely on a maximum between the two measurements, or on a minimum between the two measurements, of each sidelink relay candidate available for sidelink relay selection. In some aspects, UE 540 may rely on a weighted average of the two measurements for each sidelink relay candidate. For example, UE 540 may apply a larger weighting factor to the measurement of the sidelink signal such that measurement of the sidelink signal is prioritized for sidelink relay selection.

UE 540 may use various other filters or rules for sidelink relay selection. In some aspects, UE 540 may use the same or different filtering coefficients for measurements of Uu signals and for measurements of sidelink signals. BS 510 may configure weighting factors and combining rules. BS 510 may also configure bias offsets and/or hysteresis values for measurements of Uu signals and measurements of sidelink signals. UE 540 may use an offset to adjust a priority of each measurement. In some aspects, when a combined measurement is used, UE 540 may relax a triggering condition for sidelink relay selection. For example, a smaller threshold may be configured for a combined measurement than for a sidelink-only measurement for relay selection.

Uu signals and sidelink signals may operate either in the same frequency band or in different frequency bands. Measurements can be made in both cases. When the Uu signals and the sidelink signals are in the same frequency band, a measurement from the Uu signal can directly reflect a sidelink signal strength. When the Uu signals and the sidelink signals are in different frequency bands, the measurement of the Uu signals can be less accurate due to frequency dependency path loss.

In some aspects, if a Uu signal and a sidelink signal are in different frequency bands, UE 540 may lower a priority of a measurement of the Uu signal in a joint consideration of the measurement of the Uu signal and a measurement of the sidelink signal. UE 540 may achieve this by using a smaller filtering coefficient or a smaller weighting factor for the Uu measurement when the measurement of the Uu signal and the measurement of the sidelink signal are combined.

In some aspects, if a Uu signal and a sidelink signal are in different frequency bands, UE 540 may apply a predefined band-dependent offset to the measurement of the Uu signal to compensate for a band-dependent fading difference. The offset may reduce a weight of the measurement of the Uu signal with respect to the measurement of the sidelink signal. The offset may be configured as part of a sidelink relay measurement configuration.

While UE 540 may use a joint measurement result for a Uu signal and a sidelink signal, the joint measurement result may replace a sidelink-only measurement result as a physical layer measurement metric for sidelink relay selection. Upon obtaining the physical layer measurement, UE 540 may apply other higher layer rules to eventually select a sidelink relay UE.

UE 520 may operate as a relay UE. As shown by reference number 560, UE 540 may transmit a message to UE 520 that is relayed to BS 510. UE 520 may also receive a message relayed by UE 520 from BS 510.

As indicated above, FIG. 5 is provided as an example. Other examples may differ from what is described with regard to FIG. 5.

Figure 6:
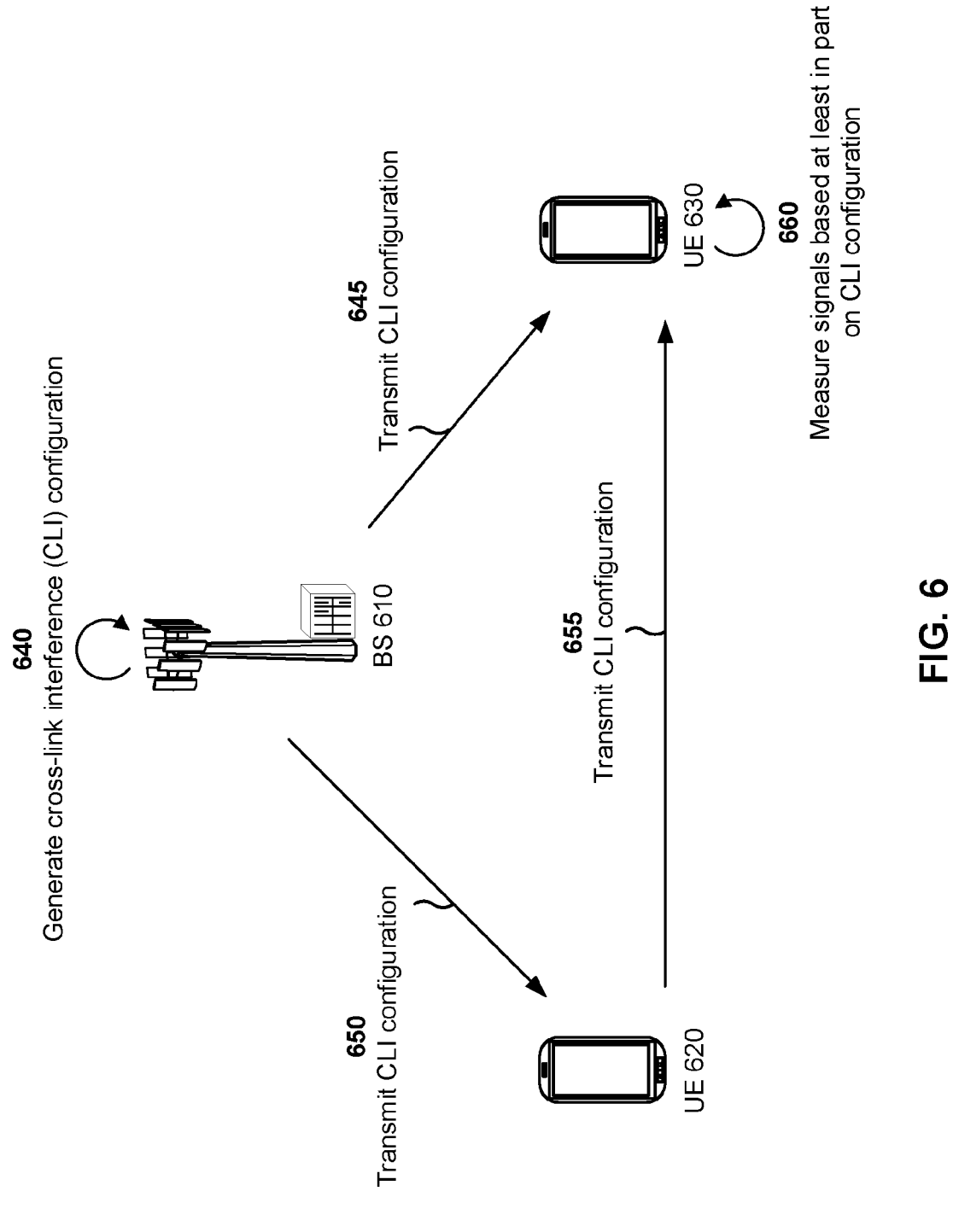
FIG. 6 is a diagram illustrating an example of using a cross-link interference configuration for hybrid measurement, in accordance with various aspects of the present disclosure.

FIG. 6 is a diagram illustrating an example 600 of using a CLI configuration for hybrid measurement, in accordance with various aspects of the present disclosure. As shown in FIG. 6, example 600 includes communications between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on a wireless access link, which may include an uplink and a downlink on a Uu interface. FIG. 6 also shows that UE 620 may communicate on a sidelink with UE 630 in sidelink mode 1, where BS 610 specifies a sidelink channel resource for transmitting a sidelink communication.

Uu inter-UE measurements may be based at least in part on an NR CLI mechanism. By using a CLI mechanism, a UE may be configured to measure another UE's uplink transmission in terms of RSRP and/or RSSI. A Uu RSRP measurement may be configured so as not to be restricted to certain signals, such as to only sounding reference signals (SRSs). The Uu RSRP measurement may be extended to demodulation reference signals (DMRS), a random access channel (RACH) preamble, and/or synchronization signals. If CLI measurement is already configured for UE 630, UE 630 may use measurement of Uu signals for sidelink relay selection.

As shown by reference number 640, BS 610 may generate a CLI configuration. The CLI configuration may indicate measurement resources or signals from a sidelink relay candidate that UE 630 is to measure for CLI with respect to sidelink relay selection. As shown by reference number 645, BS 610 may transmit the CLI configuration to UE 630.

Alternatively, as shown by reference number 650, BS 610 may transmit the CLI configuration to UE 620, which relays the CLI configuration to UE 630, as shown by reference number 655. This may be a better solution if UE 630 is already communicating with UE 620 on a sidelink channel. In some aspects, UE 630 may receive a CLI configuration on a sidelink channel from another UE that does not serve as a relay UE for UE 630. UE 630 may attempt to reselect to another relay UE with better channel conditions, if channel conditions between UE 630 and UE 620 degrade. UE 620 may add its own uplink transmission occasions or resources to the CLI configuration that is passed to UE 630. Signals of UE 620 may be measured based at least in part on the transmission occasions or the resources of UE 620 if UE 620 includes its own uplink transmission resources in the CLI configuration.

In some aspects, the CLI configuration may include an identity of each candidate relay UE so that UE 630 can associate a Uu inter-UE measurement resource to a respective candidate relay UE. This may help UE 630 use a joint measurement of a Uu signal and a sidelink signal for sidelink relay selection. The joint measurement may be a sum of a measurement of the Uu signal and the measurement of the sidelink signal. The joint measurement may be a measurement of combined Uu and sidelink signals.

As shown by reference number 660, UE 630 may measure signals based at least in part on the CLI configuration. In some aspects, this may include measuring CLI for a Uu uplink signal and/or for a sidelink signal. The CLI configuration may indicate resources or signals to measure. CLI measurements may contribute to a hybrid measurement of Uu signals and sidelink signals from UE 620 and/or from other sidelink relay candidates. UE 630 may select a relay UE from among multiple sidelink relay candidates.

As indicated above, FIG. 6 is provided as an example. Other examples may differ from what is described with regard to FIG. 6.

FIG. 7 is a diagram illustrating an example process 700 performed, for example, by a UE, in accordance with various aspects of the present disclosure. Example process 700 is an example where the UE (e.g., UE 120 depicted in FIGS. 1-2, UE 305-1 and UE 305-2 depicted in FIG. 3, UE 430, UE 450, or UE 460 depicted in FIG. 4, UE 540 depicted in FIG. 5, UE 630 depicted in FIG. 6) performs operations associated with hybrid measurement for sidelink relay selection.

As shown in FIG. 7, in some aspects, process 700 may include obtaining, for each of one or more sidelink relay candidates, a measurement of a sidelink signal and a measurement of a Uu signal to a base station (block 710). For example, the UE (e.g., using measurement component 908 depicted in FIG. 9) may obtain, for each of one or more sidelink relay candidates, a measurement of a sidelink signal and a measurement of a Uu signal to a base station, as described above.

As further shown in FIG. 7, in some aspects, process 700 may include selecting a sidelink relay candidate from among the one or more sidelink relay candidates based at least in part on a combination of the measurement of the sidelink signal and the measurement of the Uu signal for each sidelink relay candidate (block 720). For example, the UE (e.g., using selection component 910 depicted in FIG. 9) may select a sidelink relay candidate from among the one or more sidelink relay candidates based at least in part on a combination of the measurement of the sidelink signal and the measurement of the Uu signal for each sidelink relay candidate, as described above.

As further shown in FIG. 7, in some aspects, process 700 may include transmitting, to the selected sidelink relay candidate, a message that is to be relayed to the base station (block 730). For example, the UE (e.g., using transmission component 904 depicted in FIG. 9) may transmit, to the selected sidelink relay candidate, a message that is to be relayed to the base station, as described above.

Process 700 may include additional aspects, such as any single aspect or any combination of aspects described below and/or in connection with one or more other processes described elsewhere herein.

In a first aspect, obtaining the measurement of the sidelink signal for each sidelink relay candidate includes measuring the sidelink signal within a sidelink measurement gap.

In a second aspect, alone or in combination with the first aspect, obtaining the measurement of the sidelink signal for a sidelink relay candidate includes using a filter to determine a time domain average of the sidelink signals from the one or more sidelink relay candidates.

In a third aspect, alone or in combination with one or more of the first and second aspects, obtaining the measurement of the Uu signal includes measuring the Uu signal outside of a sidelink measurement gap.

In a fourth aspect, alone or in combination with one or more of the first through third aspects, the measurement of the Uu signal includes an RSRP or an RSSI for the Uu signal.

In a fifth aspect, alone or in combination with one or more of the first through fourth aspects, obtaining the measurement of the Uu signal includes measuring CLI based at least in part on a CLI configuration received from the base station.

In a sixth aspect, alone or in combination with one or more of the first through fifth aspects, obtaining the measurement of the Uu signal includes measuring CLI based at least in part on a CLI configuration received from another UE via a sidelink.

In a seventh aspect, alone or in combination with one or more of the first through sixth aspects, the CLI configuration includes uplink transmission occasions or resources of the other UE.

In an eighth aspect, alone or in combination with one or more of the first through seventh aspects, process 700 includes receiving an identity of each respective sidelink relay candidate in an inter-UE measurement resource configuration for measuring the Uu signal, and associating an inter-UE measurement resource with the respective sidelink relay candidate based at least in part on the identity, where the measurement of the Uu signal includes a measurement of the inter-UE resource.

In a ninth aspect, alone or in combination with one or more of the first through eighth aspects, process 700 includes determining the combination of the measurement of the sidelink signal and the measurement of the Uu signal based at least in part on jointly processing the measurement of the sidelink signal and the measurement of the Uu signal in a same filter.

In a tenth aspect, alone or in combination with one or more of the first through ninth aspects, process 700 includes determining the combination of the measurement of the sidelink signal and the measurement of the Uu signal based at least in part on processing the measurement of the sidelink signal and the measurement of the Uu signal with separate filters and using a maximum of the measurement of the sidelink signal and the measurement of the Uu signal for sidelink relay candidate selection.

In an eleventh aspect, alone or in combination with one or more of the first through tenth aspects, process 700 includes determining the combination of the measurement of the sidelink signal and the measurement of the Uu signal based at least in part on processing the measurement of the sidelink signal and the measurement of the Uu signal with separate filters and using a minimum of the measurement of the sidelink signal and the measurement of the Uu signal for sidelink relay candidate selection.

In a twelfth aspect, alone or in combination with one or more of the first through eleventh aspects, process 700 includes determining the combination of the measurement of the sidelink signal and the measurement of the Uu signal based at least in part on separately processing the measurement of the sidelink signal and the measurement of the Uu signal with separate filters and selecting the sidelink relay candidate based at least in part on a weighted average of the measurement of the sidelink signal and the measurement of the Uu signal.

In a thirteenth aspect, alone or in combination with one or more of the first through twelfth aspects, the measurement of the Uu signal is in a different frequency band than the measurement of the sidelink signal, and the combination includes a smaller filtering coefficient or weighting factor for the measurement of the Uu signal than for the measurement of the sidelink signal.

In a fourteenth aspect, alone or in combination with one or more of the first through thirteenth aspects, process 700 includes applying an offset to the measurement of the Uu signal based at least in part on the Uu signal being in a different frequency band than the sidelink signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
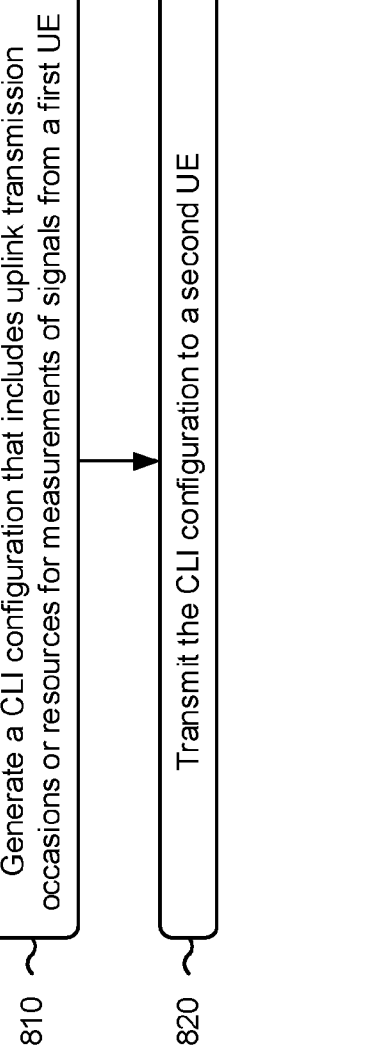
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 depicted in FIGS. 1-2, BS 410 depicted in FIG. 4, BS 510 depicted in FIG. 5, BS 610 depicted in FIG. 6) performs operations associated with hybrid measurement for sidelink relay selection.

As shown in FIG. 8, in some aspects, process 800 may include generating a CLI configuration that includes uplink transmission occasions or resources for measurements of signals from a first UE (block 810). For example, the base station (e.g., using generation component 1008 depicted in FIG. 10) may generate a CLI configuration that includes uplink transmission occasions or resources for measurements of signals from a first UE, as described above.

As further shown in FIG. 8, in some aspects, process 800 may include transmitting the CLI configuration to a second UE (block 820). For example, the base station (e.g., using transmission component 1004 depicted in FIG. 10) may transmit the CLI configuration to a second UE, as described above.

Process 800 may include additional aspects, such as any single aspect or any combination of aspects described below and/or in connection with one or more other processes described elsewhere herein.

In a first aspect, the CLI configuration specifies that the second UE is to measure one or more of an RSRP, an RSRQ, a signal-to-interference-plus-noise ratio (SINR), or an RSSI of one or more of an SRS, a DMRS, a random access channel (RACH) preamble, and/or a synchronization signal.

In a second aspect, alone or in combination with the first aspect, process 800 includes transmitting identities of sidelink relay candidates to the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
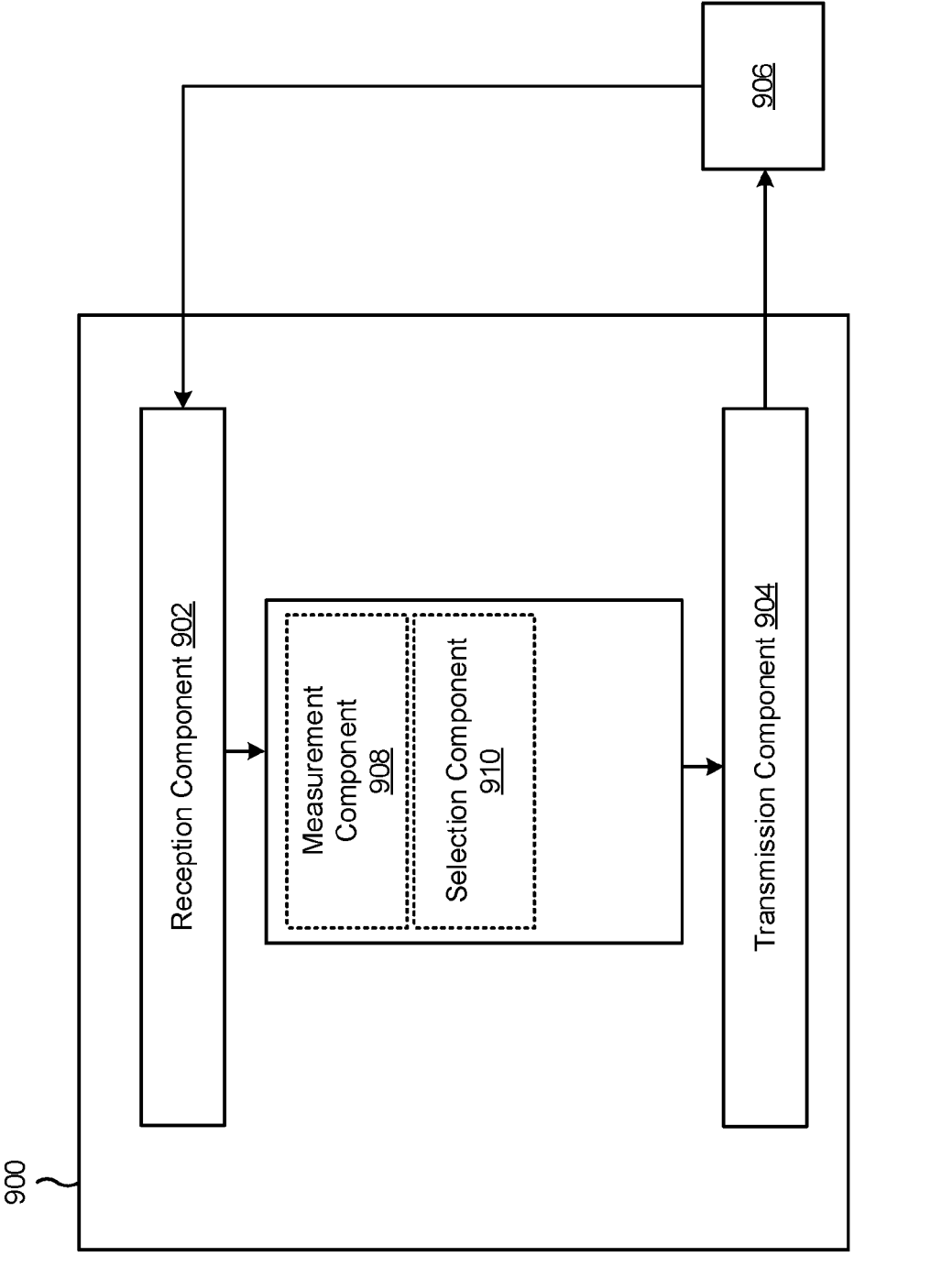
FIGS. 9-10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a measurement component 908 and/or a selection component 910.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The measurement component 908 may obtain, for each of one or more sidelink relay candidates, a measurement of a sidelink signal and a measurement of a Uu signal to a base station. The selection component 910 may select a sidelink relay candidate from among the one or more sidelink relay candidates based at least in part on a combination of the measurement of the sidelink signal and the measurement of the Uu signal for each sidelink relay candidate. The transmission component 904 may transmit, to the selected sidelink relay candidate, a message that is to be relayed to the base station.

The reception component 902 may receive an identity of each respective sidelink relay candidate in an inter-UE measurement resource configuration for measuring the Uu signal. The selection component 910 may associate an inter-UE measurement resource with the respective sidelink relay candidate based at least in part on the identity, where the measurement of the Uu signal includes a measurement of the inter-UE resource.

The selection component 910 may determine the combination of the measurement of the sidelink signal and the measurement of the Uu signal based at least in part on jointly processing the measurement of the sidelink signal and the measurement of the Uu signal in a same filter.

The selection component 910 may determine the combination of the measurement of the sidelink signal and the measurement of the Uu signal based at least in part on processing the measurement of the sidelink signal and the measurement of the Uu signal with separate filters and using a maximum of the measurement of the sidelink signal and the measurement of the Uu signal for sidelink relay candidate selection.

The selection component 910 may determine the combination of the measurement of the sidelink signal and the measurement of the Uu signal based at least in part on processing the measurement of the sidelink signal and the measurement of the Uu signal with separate filters and using a minimum of the measurement of the sidelink signal and the measurement of the Uu signal for sidelink relay candidate selection.

The selection component 910 may determine the combination of the measurement of the sidelink signal and the measurement of the Uu signal based at least in part on separately processing the measurement of the sidelink signal and the measurement of the Uu signal with separate filters and selecting the sidelink relay candidate based at least in part on a weighted average of the measurement of the sidelink signal and the measurement of the Uu signal.

The selection component 910 may apply an offset to the measurement of the Uu signal based at least in part on the Uu signal being in a different frequency band than the sidelink signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
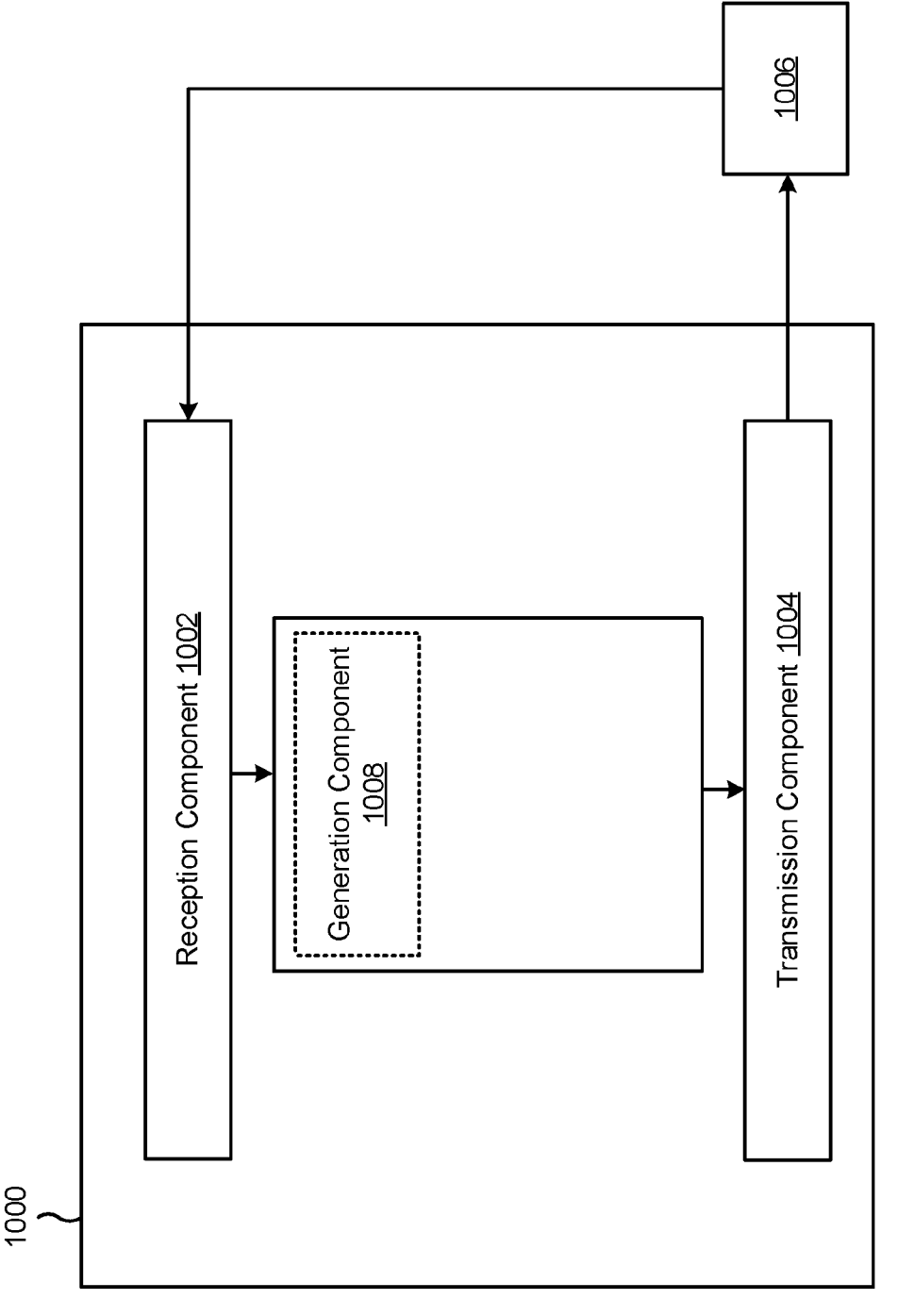

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a generation component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The generation component 1008 may generate a CLI configuration that includes uplink transmission occasions or resources for measurements of signals from a first UE. The transmission component 1004 may transmit the CLI configuration to a second UE. The transmission component 1004 may transmit identities of sidelink relay candidates to the second UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a UE, comprising: obtaining, for each of one or more sidelink relay candidates, a measurement of a sidelink signal and a measurement of a Uu signal to a base station; selecting a sidelink relay candidate from among the one or more sidelink relay candidates based at least in part on a combination of the measurement of the sidelink signal and the measurement of the Uu signal for each sidelink relay candidate; and transmitting, to the selected sidelink relay candidate, a message that is to be relayed to the base station.

Aspect 2: The method of aspect 1, wherein obtaining the measurement of the sidelink signal for each sidelink relay candidate includes measuring the sidelink signal within a sidelink measurement gap.

Aspect 3: The method of aspect 1 or 2, wherein obtaining the measurement of the sidelink signal for a sidelink relay candidate includes using a filter to determine a time domain average of the sidelink signals from the one or more sidelink relay candidates.

Aspect 4: The method of any of aspects 1-3, wherein obtaining the measurement of the Uu signal includes measuring the Uu signal outside of a sidelink measurement gap.

Aspect 5: The method of any of aspects 1-4, wherein the measurement of the Uu signal includes one or more of a reference signal received power, a reference signal received quality, a signal-to-interference-plus-noise ratio, or a reference signal strength indicator for the Uu signal.

Aspect 6: The method of any of aspects 1-5, wherein obtaining the measurement of the Uu signal includes measuring cross-link interference (CLI) based at least in part on a CLI configuration received from the base station.

Aspect 7: The method of any of aspects 1-5, wherein obtaining the measurement of the Uu signal includes measuring cross-link interference (CLI) based at least in part on a CLI configuration received from another UE via a sidelink.

Aspect 8: The method of aspect 7, wherein the CLI configuration includes uplink transmission occasions or resources of the other UE.

Aspect 9: The method of any of aspects 1-8, further comprising: receiving an identity of each respective sidelink relay candidate in an inter-UE measurement resource configuration for measuring the Uu signal; and associating an inter-UE measurement resource with the respective sidelink relay candidate based at least in part on the identity, wherein the measurement of the Uu signal includes a measurement of the inter-UE resource.

Aspect 10: The method of any of aspects 1-9, further comprising determining the combination of the measurement of the sidelink signal and the measurement of the Uu signal based at least in part on jointly processing the measurement of the sidelink signal and the measurement of the Uu signal in a same filter.

Aspect 11: The method of any of aspects 1-10, further comprising determining the combination of the measurement of the sidelink signal and the measurement of the Uu signal based at least in part on processing the measurement of the sidelink signal and the measurement of the Uu signal with separate filters and using a maximum of the measurement of the sidelink signal and the measurement of the Uu signal for sidelink relay candidate selection.

Aspect 12: The method of any of aspects 1-11, further comprising determining the combination of the measurement of the sidelink signal and the measurement of the Uu signal based at least in part on processing the measurement of the sidelink signal and the measurement of the Uu signal with separate filters and using a minimum of the measurement of the sidelink signal and the measurement of the Uu signal for sidelink relay candidate selection.

Aspect 13: The method of any of aspects 1-12, further comprising determining the combination of the measurement of the sidelink signal and the measurement of the Uu signal based at least in part on separately processing the measurement of the sidelink signal and the measurement of the Uu signal with separate filters and selecting the sidelink relay candidate based at least in part on a weighted average of the measurement of the sidelink signal and the measurement of the Uu signal.

Aspect 14: The method of any of aspects 1-13, wherein the measurement of the Uu signal is in a different frequency band than the measurement of the sidelink signal, and wherein the combination includes a smaller filtering coefficient or weighting factor for the measurement of the Uu signal than for the measurement of the sidelink signal.

Aspect 15: The method of any of aspects 1-14, further comprising applying an offset to the measurement of the Uu signal based at least in part on the Uu signal being in a different frequency band than the sidelink signal.

Aspect 16: A method of wireless communication performed by a base station, comprising: generating a cross-link interference (CLI) configuration that includes uplink transmission occasions or resources for measurements of signals from a first user equipment (UE); and transmitting the CLI configuration to a second UE.

Aspect 17: The method of aspect 16, wherein the CLI configuration specifies that the second UE is to measure a reference signal received power or a reference signal strength indicator of one or more of a sounding reference signal, a demodulation reference signal, a random access channel preamble, or a synchronization signal.

Aspect 18: The method of aspect 16 or 17, further comprising transmitting identities of sidelink relay candidates to the second UE.

Aspect 19: An apparatus for wireless communication at a device, comprising a processor; memory coupled with the processor; and instructions stored in the memory and executable by the processor to cause the apparatus to perform the method of one or more aspects of aspects 1-18.

Aspect 20: A device for wireless communication, comprising a memory and one or more processors coupled to the memory, the memory and the one or more processors configured to perform the method of one or more aspects of aspects 1-18.

Aspect 21: An apparatus for wireless communication, comprising at least one means for performing the method of one or more aspects of aspects 1-18.

Aspect 22: A non-transitory computer-readable medium storing code for wireless communication, the code comprising instructions executable by a processor to perform the method of one or more aspects of aspects 1-18.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-18.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    obtaining, for each of one or more sidelink relay candidates, a measurement of a sidelink signal and a measurement of a signal from a respective sidelink relay candidate of the one or more sidelink relay candidates to a base station;
    applying an offset to the measurement of the signal that is from the respective sidelink relay candidate to the base station based at least in part on the signal being in a different frequency band than the sidelink signal;
    selecting a sidelink relay candidate from among the one or more sidelink relay candidates based at least in part on a combination of the measurement of the sidelink signal and the measurement of the signal that is from the respective sidelink relay candidate to the base station for each sidelink relay candidate of the one or more sidelink relay candidates; and
    transmitting, to the selected sidelink relay candidate, a message that is to be relayed to the base station.

2. The method of claim 1, wherein obtaining the measurement of the sidelink signal for each sidelink relay candidate of the one or more sidelink relay candidates includes measuring the sidelink signal within a sidelink measurement gap.

3. The method of claim 1, wherein obtaining the measurement of the sidelink signal for the respective sidelink relay candidate includes using a filter to determine a time domain average of the sidelink signals from the one or more sidelink relay candidates.

4. The method of claim 1, wherein obtaining the measurement of the signal that is from the respective sidelink relay candidate to the base station includes measuring the signal that is from the respective sidelink relay candidate to the base station outside of a sidelink measurement gap.

5. The method of claim 1, wherein the measurement of the signal that is from the respective sidelink relay candidate to the base station includes one or more of a reference signal received power, a reference signal received quality, a signal-to-interference-plus-noise ratio, or a reference signal strength indicator for the signal from the respective sidelink relay candidate to the base station.

6. The method of claim 1, wherein obtaining the measurement of the signal that is from the respective sidelink relay candidate to the base station includes measuring cross-link interference (CLI) based at least in part on a CLI configuration received from the base station.

7. The method of claim 1, wherein obtaining the measurement of the signal that is from the respective sidelink relay candidate to the base station includes measuring cross-link interference (CLI) based at least in part on a CLI configuration received from another UE via a sidelink.

8. The method of claim 7, wherein the CLI configuration includes uplink transmission occasions or resources of the other UE.

9. The method of claim 1, further comprising:
    receiving an identity of each respective sidelink relay candidate in an inter-UE measurement resource configuration for measuring the signal that is from the respective sidelink relay candidate to the base station; and
    associating an inter-UE measurement resource with the respective sidelink relay candidate based at least in part on the identity, wherein the measurement of the signal that is from the respective sidelink relay candidate to the base station includes a measurement of the inter-UE resource.

10. The method of claim 1, further comprising:
    determining the combination of the measurement of the sidelink signal and the measurement of the signal that is from the respective sidelink relay candidate to the base station based at least in part on jointly processing the measurement of the sidelink signal and the measurement of the signal that is from the respective sidelink relay candidate to the base station in a same filter.

11. The method of claim 1, further comprising:
determining the combination of the measurement of the sidelink signal and the measurement of the signal that is from the respective sidelink relay candidate to the base station based at least in part on processing the measurement of the sidelink signal and the measurement of the signal that is from the respective sidelink relay candidate to the base station with separate filters and using a maximum of the measurement of the sidelink signal and the measurement of the signal that is from the respective sidelink relay candidate to the base station for sidelink relay candidate selection.

12. The method of claim 1, further comprising:
determining the combination of the measurement of the sidelink signal and the measurement of the signal that is from the respective sidelink relay candidate to the base station based at least in part on processing the measurement of the sidelink signal and the measurement of the signal that is from the respective sidelink relay candidate to the base station with separate filters and using a minimum of the measurement of the sidelink signal and the measurement of the signal that is from the respective sidelink relay candidate to the base station for sidelink relay candidate selection.

13. The method of claim 1, further comprising:
determining the combination of the measurement of the sidelink signal and the measurement of the signal that is from the respective sidelink relay candidate to the base station based at least in part on separately processing the measurement of the sidelink signal and the measurement of the signal that is from the respective sidelink relay candidate to the base station with separate filters and selecting the sidelink relay candidate based at least in part on a weighted average of the measurement of the sidelink signal and the measurement of the signal that is from the respective sidelink relay candidate to the base station.

14. The method of claim 1, wherein the measurement of the signal that is from the respective sidelink relay candidate to the base station is in a different frequency band than the measurement of the sidelink signal, and wherein the combination includes a smaller filtering coefficient or weighting factor for the measurement of the signal that is from the respective sidelink relay candidate to the base station than for the measurement of the sidelink signal.

15. A user equipment (UE) for wireless communication, comprising:
one or more memories; and
one or more processors coupled to the one or more memories, the one or more processors configured to cause the UE to:
obtain, for each of one or more sidelink relay candidates, a measurement of a sidelink signal and a measurement of a signal from a respective sidelink relay candidate of the one or more sidelink relay candidates to a base station;
apply an offset to the measurement of the signal that is from the respective sidelink relay candidate to the base station based at least in part on the signal being in a different frequency band than the sidelink signal;
select a sidelink relay candidate from among the one or more sidelink relay candidates based at least in part on a combination of the measurement of the sidelink signal and the measurement of the signal that is from the respective sidelink relay candidate to the base station for each sidelink relay candidate of the one or more sidelink relay candidates; and
transmit, to the selected sidelink relay candidate, a message that is to be relayed to the base station.

16. The UE of claim 15, wherein the one or more processors, when obtaining the measurement of the sidelink signal for each sidelink relay candidate, are configured to measure the sidelink signal within a sidelink measurement gap.

17. The UE of claim 15, wherein the one or more processors, when obtaining the measurement of the signal that is from the respective sidelink relay candidate to the base station, are configured to measure the signal that is from the respective sidelink relay candidate to the base station outside of a sidelink measurement gap.

18. The UE of claim 15, wherein the one or more processors, when obtaining the measurement of the signal that is from the respective sidelink relay candidate to the base station, are configured to measure cross-link interference (CLI) based at least in part on a CLI configuration received from another UE via a sidelink.

19. The UE of claim 15, wherein the one or more processors are further configured to cause the UE to:
receive an identity of each respective sidelink relay candidate in an inter-UE measurement resource configuration for measuring the signal that is from the respective sidelink relay candidate to the base station; and
associate an inter-UE measurement resource with the respective sidelink relay candidate based at least in part on the identity, wherein the measurement of the signal that is from the respective sidelink relay candidate to the base station includes a measurement of the inter-UE resource.

20. The UE of claim 15, wherein the one or more processors are further configured to:
determine the combination of the measurement of the sidelink signal and the measurement of the signal that is from the respective sidelink relay candidate to the base station based at least in part on jointly processing the measurement of the sidelink signal and the measurement of the signal that is from the respective sidelink relay candidate to the base station in a same filter.

21. The UE of claim 15, wherein the one or more processors are further configured to:
determine the combination of the measurement of the sidelink signal and the measurement of the signal that is from the respective sidelink relay candidate to the base station based at least in part on processing the measurement of the sidelink signal and the measurement of the signal that is from the respective sidelink relay candidate to the base station with separate filters and using a maximum of the measurement of the sidelink signal and the measurement of the signal that is from the respective sidelink relay candidate to the base station for sidelink relay candidate selection.

22. The UE of claim 15, wherein the one or more processors are further configured to:
determine the combination of the measurement of the sidelink signal and the measurement of the signal that is from the respective sidelink relay candidate to the base station based at least in part on processing the measurement of the sidelink signal and the measurement of the signal that is from the respective sidelink relay candidate to the base station with separate filters and using a minimum of the measurement of the sidelink signal and the measurement of the signal that is from the respective sidelink relay candidate to the base station for sidelink relay candidate selection.

23. The UE of claim 15, wherein the one or more processors are further configured to:

determine the combination of the measurement of the sidelink signal and the measurement of the signal that is from the respective sidelink relay candidate to the base station based at least in part on separately processing the measurement of the sidelink signal and the measurement of the signal that is from the respective sidelink relay candidate to the base station with separate filters and selecting the sidelink relay candidate based at least in part on a weighted average of the measurement of the sidelink signal and the measurement of the signal that is from the respective sidelink relay candidate to the base station.

24. The UE of claim 15, wherein the measurement of the signal that is from the respective sidelink relay candidate to the base station is in a different frequency band than the measurement of the sidelink signal, and wherein the combination includes a smaller filtering coefficient or weighting factor for the measurement of the signal that is from the respective sidelink relay candidate to the base station than for the measurement of the sidelink signal.

25. A non-transitory computer-readable medium storing a set of instructions for wireless communication, the set of instructions comprising one or more instructions that, when executed by one or more processors of a user equipment (UE), cause the UE to:

obtain, for each of one or more sidelink relay candidates, a measurement of a sidelink signal and a measurement of a signal from a respective sidelink relay candidate of the one or more sidelink relay candidates to a base station;

apply an offset to the measurement of the signal that is from the respective sidelink relay candidate to the base station based at least in part on the signal being in a different frequency band than the sidelink signal;

select a sidelink relay candidate from among the one or more sidelink relay candidates based at least in part on a combination of the measurement of the sidelink signal and the measurement of the signal that is from the respective sidelink relay candidate to the base station for each sidelink relay candidate of the one or more sidelink relay candidates; and transmit, to the selected sidelink relay candidate, a message that is to be relayed to the base station.

26. The non-transitory computer-readable medium of claim 25, wherein the one or more instructions, when executed by the one or more processors of the UE to obtain the measurement of the signal from the respective sidelink relay candidate to the base station, cause the UE to:

measure cross-link interference (CLI) based at least in part on a CLI configuration received from another UE via a sidelink.

27. The non-transitory computer-readable medium of claim 25, wherein the one or more instructions, when executed by the one or more processors of the UE, cause the UE to:

determine the combination of the measurement of the sidelink signal and the measurement of the signal that is from the respective sidelink relay candidate to the base station based at least in part on processing the measurement of the sidelink signal and the measurement of the signal that is from the respective sidelink relay candidate to the base station with separate filters and using a minimum of the measurement of the sidelink signal and the measurement of the signal that is from the respective sidelink relay candidate to the base station for sidelink relay candidate selection.

28. The non-transitory computer-readable medium of claim 25, wherein the one or more instructions, when executed by the one or more processors of the UE, cause the UE to:

receive an identity of each respective sidelink relay candidate in an inter-UE measurement resource configuration for measuring the signal that is from the respective sidelink relay candidate to the base station; and associate an inter-UE measurement resource with the respective sidelink relay candidate based at least in part on the identity, wherein the measurement of the signal that is from the respective sidelink relay candidate to the base station includes a measurement of the inter-UE resource.

29. The non-transitory computer-readable medium of claim 25, wherein the obtain the measurement of the sidelink signal for each sidelink relay candidate of the one or more sidelink relay candidates includes measuring the sidelink signal within a sidelink measurement gap.

30. The non-transitory computer-readable medium of claim 25, wherein the obtain the measurement of the sidelink signal for the respective sidelink relay candidate includes using a filter to determine a time domain average of the sidelink signals from the one or more sidelink relay candidates.

* * * * *